Oct. 12, 1954 S. W. NOBLE ET AL 2,691,728

ELECTRICAL STORAGE APPARATUS

Filed June 5, 1950

S.W. NOBLE & L.H. BANNISTER
*Inventors*

By Moore and Hall.
*Attorneys*

Patented Oct. 12, 1954 2,691,728

UNITED STATES PATENT OFFICE 2,691,728

ELECTRICAL STORAGE APPARATUS

Spencer W. Noble, Upper Colwall, and Lawrence H. Bannister, Great Malvern, England, assignors to National Research Development Corporation, London, England, a British corporation Application June 5, 1950, Serial No. 166,212

Claims priority, application Great Britain June 22, 1949

12 Claims. (Cl. 250—27)

This invention relates to electrical storage apparatus and more particularly to such apparatus in which information is stored or recorded in the form of an electrical charge which is impressed upon a capacitor. Such circuits have application where it is desired to record not indefinitely but for short durations of time discrete items of information which may be represented as defined voltage levels. Such a storage apparatus may for example be employed to record information of a digital character.

It is the object of the present invention to provide such electrical charge storage apparatus which is capable of recording information which may be represented by two or more discrete voltage levels and also to provide such a system employing the storing of electrical charge upon capacitor elements which is capable of holding stored information for periods relatively long compared with the intervals during which the signals representing in dynamic form the data to be recorded may exist.

According to the present invention there is provided an electronic storage circuit of the type in which a storage capacitor is charged to an extent indicative of information to be stored, comprising a high gain amplifier, a negative feedback circuit associated therewith, a storage condenser connected in said negative feedback circuit and gating means for withdrawn a large current from, or injecting a large current into, the storage condenser to reduce or increase the level of charge on the storage condenser to a desired level.

According to a feature of the invention the high gain amplifier comprises a multielectrode valve having a resistive anode load and the negative feedback circuit comprises a cathode follower circuit, the control grid of the cathode follower valve being connected directly to the anode of said high gain amplifier and the cathode of the cathode follower being connected via said storage condenser to the control grid of the amplifier.

According to a further feature of the invention the gating means comprises two multielectrode thermionic valves gated on their control grids by pulse information to be stored.

According to a still further feature of the invention stabilisation means are also provided to stabilise the charge on the storage condenser at a predetermined level conditionally upon the receipt of pulse information to be stored.

The invention will be more clearly understood from the following description given with reference to the accompanying drawings.

Figure 1:
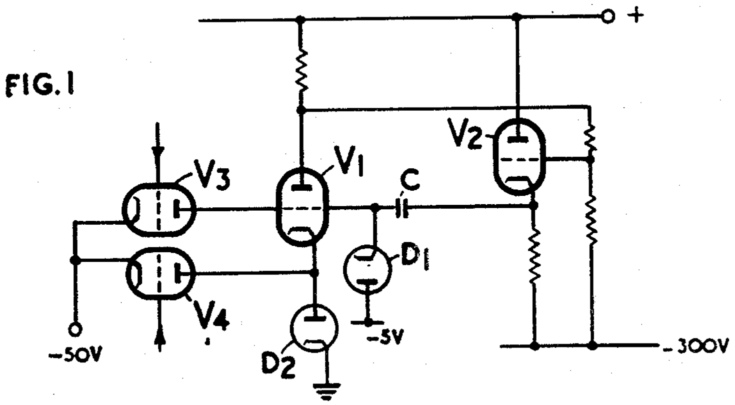
Fig. 1 is a circuit diagram of one arrangement according to the invention.

Referring now to Fig. 1, the gain of the high gain amplifier circuit comprising valve V1 is made so great that its grid may be regarded as a virtual earth, and changes of grid potential may be ignored as they are insignificantly small compared with the other voltage changes which will occur in the circuit. Feedback from the anode to the cathode of V1 is provided via the direct coupled cathode follower stage comprising valve V2, and the charge storage capacitor C.

If there is no current flowing into or out of the grid of V1, that is if the insulation resistance of the capacitor C is infinitely great, there will be no current flowing into or out of the capacitor so that the charge on it will remain constant and the voltage across it and therefore the voltage at the cathode of V2 will remain constant. If the voltage at the cathode of V2 does change a current will flow into or out of the capacitor C and the voltage at the grid of V1 will be altered thereby to cause a larger change of voltage at the grid of V2. The corresponding change of voltage at the cathode of V2 will oppose the original change and hence the circuit operates to keep the voltage of the cathode of V2 and therefore the potential across C constant.

In a practical case the insulation of the capacitor is not infinite and a current will flow into or away from the grid of V1 and a change of the voltage at the cathode of V2 will be produced; this change will be very slow and will be such as will cause a current to flow into or away from the condenser which exactly opposes the current flowing at the grid of V1 from the finite resistance path.

If by an external gating mechanism a large current is caused to flow into or away from the grid of V1 the voltage at the cathode of V2 will change rapidly to cause an exactly opposing current to flow into or away from the grid via the capacitor C. While the external current flowing into or out of the grid of V1 is maintained the voltage at the cathode of V2 will continue to change until this change is limited by overloading of V1 or V2. The valves V3 and V4 provide the necessary input currents to effect this operation. Valves V3 and V4, the cathodes of which are returned to a source of negative potential, say —50 v., are normally cut off by a bias applied to their control grids from a biassing circuit arrangement not indicated in the circuit diagram. If by means of a suitable pulse valve V3 is caused to conduct, a current flows into the grid of V1 and if no other change occurs the valve V1 conducts less freely the voltage at its anode becoming more positive. This change of anode voltage of the valve V1 causes the voltage of the grid and cathode of V2 to become more positive at a rate such as to produce in the capacitor C a current which exactly opposes the current flowing to the grid of valve V1 through valve V3. The condenser is thereby charged with the cathode of V2 positive.

If on the other hand the valve V4 is made conducting a current flows through it and also through valve V1 and makes the voltage at the cathode of V1 negative. The diode D2 will be cut-off when this occurs, to permit the cathode potential of V1 to fall. The anode current in valve V1 thus increases and causes the anode voltage to become less positive, this fall of anode voltage in turn causing the grid and cathode of V2 to become less positive. The change of voltage at the cathode of V2 causes a current to flow into the capacitor C with the result that the voltage at the grid of V1 moves negatively until it has become so negative that the diode D1 conducts and holds the grid potential approximately at the level of the bias applied to the anode of the diode. The cathode of V1 is made more negative by the current flowing through valves V4 and V1 and so the valve V1 conducts freely; this causes the voltage at the cathode of V2 to move even more negatively and the capacitor C is thereby charged with the cathode of V2 negative.

The voltage finally obtaining at the cathode of valve V2 in either case is determined by the length of time for which the input current through V3 or V4 is maintained but if the time required to cause the capacitor to be fully charged to the limit imposed by overloading of V1 or V2 is short compared with the time for which the input current via V3 or V4 is available which is in practice the case, the final voltage at the cathode of V2 will be reached when either V1 or V2 becomes fully conducting or fully non-conducting. The voltage obtaining when such limiting occurs is completely independent of the state of charge existing in the capacitor before the input current was provided and the potential at the cathode of V2 is thus a qualitative record of the polarity of the signal which was initially applied to switch on one or other of the valves V3, V4.

Figure 2:
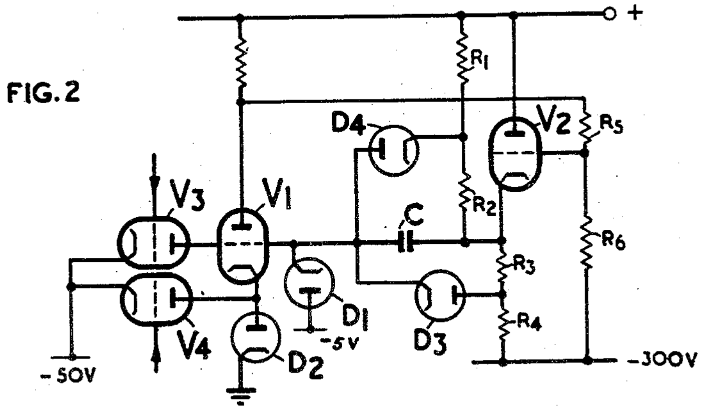
Fig. 2 is a further circuit diagram of an arrangement similar to that shown in Fig. 1 but embodying a refinement.

Fig. 2 indicates a modified circuit arrangement which makes the limiting virtually independent of valve parameters and is substantially the same as the circuit arrangement of Fig. 1 differing only in that two diodes D3 and D4 are connected across the condenser C, suitable delay voltages being applied to the diodes from the junctions of the resistors R1, R2 and R3, R4.

When the input current fed through valve V3 or V4 of Fig. 2 causes a change of the voltage at the cathode of V2 the voltages at the cathode of diode D4 and at the anode of diode D3 also change. If the voltage at the cathode of valve V2 is moving positively the diode D3 ultimately conducts, while if the voltage at the cathode of V2 is moving negatively, the diode D4 will ultimately conduct. When either diode D3 or D4 conducts a further current flows into or away from the grid of valve V1 and the voltage at the cathode of V2 will cease to change when the current flowing through either D3 or D4 exactly opposes the current flowing through valve V3 or V4. The diodes D3 and D4 therefore limit the most positive and the most negative voltages which can obtain at the cathode of V2. When the valve V3 or V4 is made non-conducting at the end of the setting pulse the voltage at the cathode of V2 will change by a small but sufficient amount to cause the diode D3 or D4 (whichever was conducting) to cease to conduct and thereafter will, if the insulation of the condenser is infinitely high, remain constant.

The circuit arrangements described above are essentially two-state devices in that the voltage at the cathode of valve V2 may be set to either of two pre-determined levels by application of a setting pulse to the appropriate valve V3 or V4. If appropriate means is provided for first setting the required state, the circuit arrangement of the invention may be modified to record any desired number of conditions as distinct charges on the feedback capacitor and corresponding distinct voltages at the cathode of V2.

Figure 3:
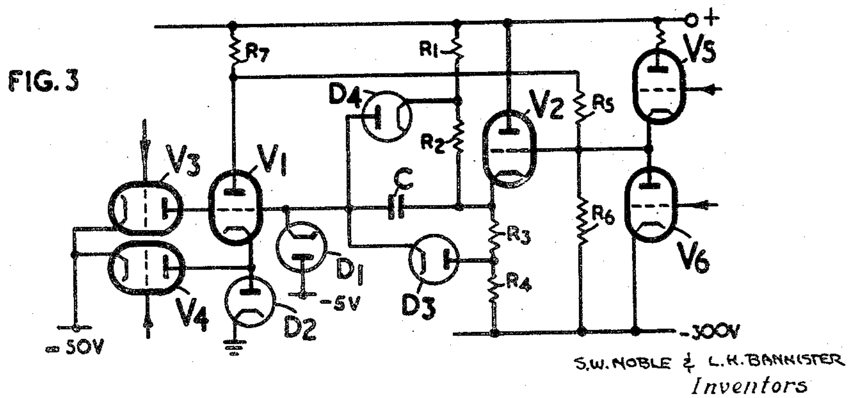
Fig. 3 is a circuit diagram showing an arrangement similar to that of Fig. 2 but embodying yet a further facility.

One modified arrangement which permits the recording of three distinct states is indicated in Fig. 3. The circuit arrangement of Fig. 3 corresponds with the arrangement of Fig. 2 but there are provided in addition means for stabilising the charge on the storage condenser at a predetermined level conditionally upon receipt of further pulsed information to be stored, comprising two serially connected valves V5 and V6, the cathode of V5 being connected to the grid of valve V2. The grid potentials of valves V5 and V6 are provided from a suitable potential divider arrangement, which is not shown in the drawing, and the potentials are such that the valves V5, V6 are normally non-conducting. The cathode voltage of valve V2 may then be set into either of two states as previously described by operation of a setting pulse upon valve V3 or V4.

If valve V5 is now made to conduct by returning its grid to a suitable potential, the voltage at the grid of valve V2 will be prevented by cathode follower action in valve V5 from becoming more negative than the voltage applied to the grid of valve V5. If it is originally more negative it will be caused to move positively by a current which will flow through R6 and V5. If simultaneously the valve V6 is made to conduct the voltage at the grid of valve V2 will, if it is initially more positive than the grid of V5, be made progressively negative, by a current which will flow in R5 and R7 and valve V6, until the voltage of the grid of V2 becomes equal to the voltage applied to the grid of V5.

The voltage at the grid of V2 and hence at its cathode may thus be set to a third predetermined level controlled by the grid potential applied to valve V5 and the circuit may be caused to record, qualitatively, the third condition, irrespective of the initial condition of the circuit, by application of suitable setting pulses to the grids of valves V5 and V6 which render those valves conducting for the duration of the pulses. The pulsing of the valve grids may be obtained in any known manner, for example, by the direct application of voltage pulses to the grids or by switching the grids, by biassed diodes for example, to points at appropriate voltage levels. By selection of the voltage to which the grid of V5 is raised by the setting pulse, the voltage obtaining at the cathode of V2 may be set to any desired value and it is apparent that a number of states, additional to those obtained by application of an appropriate pulse to valve V3 or valve V4, may be recorded by arranging that the signals to be qualitatively recorded cause the grid voltage of V5 to be set at appropriate levels.

We claim:

1. An electronic storage circuit in which a storage capacitor is charged to an extent indicative of information to be stored, comprising a high gain amplifier, a cathode follower, the grid of the cathode follower being connected to the anode of said high gain amplifier, a storage condenser connected between the cathode of the cathode follower and the control grid of said high gain amplifier, two multielectrode thermionic valves connected to said high gain amplifier and means for feeding gating signals to their control grids to rapidly alter the level of charge on said storage condenser, wherein one of said thermionic valves has its anode connected to the cathode of the high gain amplifier valve and its cathode connected to a source of negative potential and wherein there is provided a unilaterally conducting device having its cathode connected to the control grid of said amplifier valve and its anode connected to a source of negative bias and a further unilaterally conducting device having its anode connected to the cathode of said amplifier valve and its cathode connected to a source of low potential.

2. An electronic storage circuit in which a storage capacitor is charged to an extent indicative of information to be stored, comprising a high gain amplifier, a cathode follower, the grid of the cathode follower being connected to the anode of said high gain amplifier, a storage condenser connected between the cathode of the cathode follower and the control grid of said high gain amplifier, a multielectrode thermionic valve having its anode connected to the grid of the high gain amplifier valve and its cathode connected to a source of negative potential, a multielectrode thermionic valve having its anode connected to the cathode of the high gain amplifier valve and its cathode to a source of negative potential, a unilaterally conducting device having its cathode connected to the control grid of said amplifier valve and its anode connected to a source of negative bias and a further unilaterally conducting device having its anode connected to the cathode of said amplifier valve and its cathode connected to a source of low potential.

3. An electronic storage circuit in which a storage capacitor is charged to an extent indicative of information to be stored, comprising a high gain amplifier, a cathode follower, the grid of the cathode follower being connected to the anode of said high gain amplifier, a storage condenser connected between the cathode of the cathode follower and the control grid of said high gain amplifier, gating means connected to said high gain amplifier, means for feeding signals to said gating means to condition it to rapidly alter the level of charge on the storage condenser, two serially connected multielectrode thermionic valves, the junction between which is connected to the control grid of the cathode follower valve, biassing means applied to the control grids of said serially connected valves to render them non-conducting, and means for feeding pulse information to be stored to their control grids to lift the bias thereon.

4. In a pulse storage circuit, a first electron discharge device having a cathode, a grid and an anode; a second electron discharge device having a cathode, a grid and an anode, a lead connecting the first-named anode to the second named grid, a source of potential having a positive side connected to said anodes and a negative side connected to said cathodes, a resistor in series with the cathode of the second electron discharge device, a storage condenser connected between the second-named cathode and the first-named grid, control means for applying a negative impulse to the first-named grid comprising a third electron discharge device having an anode connected to the grid of the first-named electron discharge device, the third electron discharge device having a cathode connected to a negative potential and also having a control grid acting as an input, and a rectifier in series with the cathode circuit of the first-named electron discharge device, the anode of the rectifier being connected to the cathode of the first-named electron discharge device.

5. A pulse storage circuit for storing either of two digits of information comprising a condenser, a resistor, a first connection between one side of said resistor and one side of said condenser, a source of direct current, potential having its negative pole connected to the other side of said resistor, means connecting the other side of the condenser to the source at a potential intermediate of the positive and negative poles thereof, first and second input elements, switching means controlled by said elements for connecting said first connection to the positive pole of said source when an impulse arrives at the first input element and which disconnects the first connection from said positive pole when an impulse is received at the second element, and first and second limiters that respectively limit the charging potentials on the condenser when the first and second inputs are energized.

6. An electronic storage circuit in which a storage capacitor is charged to an extent indicative of information to be stored, comprising a high gain amplifier, a cathode follower, the grid of the cathode follower being direct-current coupled to the anode of said high gain amplifier, said storage capacitor being connected between the cathode of the cathode follower and the control grid of said high gain amplifier, gating means, low impedance channels controlled by said gating means for feeding current to or from the grid of said amplifier, and means for feeding signals to said gating means to control the flow of current to or from the grid of said amplifier to rapidly alter the level of charge on said storage condenser.

7. An electronic storage circuit as claimed in claim 6 wherein one of said gating means comprises a thermionic valve having an anode connected to the grid of said high gain amplifier, a cathode connected to a low potential source, a control grid and means for feeding signals to said control grid.

8. An electronic storage circuit as claimed in claim 6, wherein one of said gating means comprises a thermionic valve having an anode connected to the cathode of said amplifier, a cathode connected to a low potential source, a control grid and means for feeding signals to said control grid, in combination with a unilaterally conducting device having a cathode connected to the grid of said amplifier and an anode connected to a low potential source.

9. An electronic storage circuit in which a storage capacitor is charged to an extent indicative of information to be stored, comprising a high gain amplifier, a cathode follower, the grid of the cathode follower being direct current coupled to the anode of said high gain amplifier, said storage capacitor being connected between the cathode of the cathode follower and the control grid of said high gain amplifier, gating means, low impedance channels controlled by said gating means for feeding current to or from the grid of said amplifier and means for feeding signals to said gating means to control the flow of current to or from the grid of said amplifier to rapidly alter the level of charge on said storage condenser, in combination with stabilisation means connected to the control grid of the cathode follower valve to stabilise the potential thereof, said stabilisation means comprising a pair of serially connected thermionic valves the junction between which is connected to the grid of the cathode follower valve, and means for applying setting pulses to the control grids of said serially connected valves to set the potential of the grid of said cathode follower valve to a predetermined potential.

10. An electronic storage circuit as claimed in claim 6, wherein one of said gating means comprises a thermionic valve having an anode connected to the grid of said high gain amplifier, a cathode connected to a low potential source, a control grid and means for feeding signals to said control grid in combination with stabilisation means connected to the control grid of the cathode follower valve to stabilise the potential thereof, said stabilisation means comprising a pair of serially connected thermionic valves the junction between which is connected to the grid of the cathode follower valve, and means for applying setting pulses to the control grids of said serially connected valves to set the potential of the grid of said cathode follower valve to a predetermined potential.

11. An electronic storage circuit as claimed in claim 6, wherein one of said gating means comprises a thermionic valve having an anode connected to the cathode of said amplifier, a cathode connected to a low potential source, a control grid and means for feeding signals to said control grid, in combination with a unilaterally conducting device having a cathode connected to the grid of said amplifier and an anode connected to a low potential source and in combination with stabilisation means connected to the control grid of the cathode follower valve to stabilise the potential thereof, said stabilisation means comprising a pair of serially connected thermionic valves the junction between which is connected to the grid of the cathode follower valve, and means for applying setting pulses to the control grids of said serially connected valves to set the potential of the grid of said cathode follower valve to a predetermined potential.

12. In a pulse storage circuit, a first electron discharge device having a cathode, a grid and an anode; a second electron discharge device having a cathode, a grid and an anode; a lead connecting the first-named anode to the second-named grid; a source of potential having a positive side connected to said anodes and a negative side connected to said cathodes; a resistor in series with the cathode of the second electron discharge device; a storage condenser connected between the second-named cathode and the first-named grid; control means for applying a negative impulse to the first-named grid and comprising a third electron discharge device having an anode connected to the grid of the first-named electron discharge device, the third electron discharge device having a cathode connected to a negative potential and also having a control grid acting as an input; a first rectifier in series with the cathode circuit of the first-named electron discharge device, the anode of the said first rectifier being connected to the cathode of the first-named electron discharge device; and a second rectifier having a cathode connected to the grid of the first-named electron discharge device and having an anode connected to a negative potential.

References Cited in the file of this patent

UNITED STATES PATENTS

| Number | Name | Date |
|---|---|---|
| 2,251,973 | Beale et al. | Aug. 12, 1941 |
| 2,426,256 | Zenor | Aug. 26, 1947 |
| 2,439,324 | Walker | Apr. 6, 1948 |
| 2,445,448 | Miller | July 20, 1948 |
| 2,468,687 | Schmitt | Apr. 26, 1949 |
| 2,534,387 | Thomas | Dec. 19, 1950 |
| 2,562,792 | James | July 31, 1951 |

FOREIGN PATENTS

| Number | Country | Date |
|---|---|---|
| 587,364 | Great Britain | Apr. 23, 1947 |
| 963,762 | France | Jan. 12, 1950 |

OTHER REFERENCES

Fig. 7.28 on page 282 of "Waveforms," vol. 19, Radiation Lab. Series, April 9, 1949.